(12) United States Patent
Huang et al.

(10) Patent No.: US 7,341,803 B2
(45) Date of Patent: Mar. 11, 2008

(54) BATTERY WITH INCREASED ELECTRODE INTERFACIAL SURFACE AREA AND INCREASED ACTIVE MATERIALS

(75) Inventors: Weiwei Huang, Westlake, OH (US); Philip J. Slezak, North Ridgeville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1054 days.

(21) Appl. No.: 10/376,830

(22) Filed: Feb. 28, 2003

(65) Prior Publication Data

US 2004/0058235 A1    Mar. 25, 2004

Related U.S. Application Data

(63) Continuation-in-part of application No. 10/251,002, filed on Sep. 20, 2002, now Pat. No. 6,869,727.

(51) Int. Cl.
*H01M 4/02* (2006.01)
*H01M 4/42* (2006.01)
*H01M 4/50* (2006.01)

(52) U.S. Cl. ............... 429/209; 429/229; 429/224; 429/231.1; 429/206

(58) Field of Classification Search ............ 429/224, 429/231.1, 231.4, 229, 206, 165, 233, 232, 429/209, 242, 129, 60; 204/260, 272, 280
See application file for complete search history.

(56) References Cited

U.S. PATENT DOCUMENTS

| | | |
|---|---|---|
| 316,409 A | 4/1885 | Shaw |
| 678,512 A | 7/1901 | Perry |
| 1,626,173 A | 4/1927 | Yngve |
| 1,641,524 A | 9/1927 | Birdsall |
| 2,480,839 A | 9/1949 | Daniel |
| 2,542,094 A | 2/1951 | Richardson |
| 2,542,574 A | 2/1951 | Ruben |
| 2,542,576 A | 2/1951 | Ruben |
| 2,960,558 A | 11/1960 | Marsal et al. |
| 2,977,401 A | 4/1961 | Marsal et al. |
| 2,980,747 A | 4/1961 | Daley |
| 3,156,585 A | 11/1964 | Yamano et al. |
| 3,196,051 A | 7/1965 | Balaguer |
| 3,335,031 A | 8/1967 | Kordesch |
| 3,350,235 A | 10/1967 | Balaguer |

(Continued)

FOREIGN PATENT DOCUMENTS

DE     431881     7/1926

(Continued)

OTHER PUBLICATIONS

Karl V. Kordesch—"Batteries—vol. 1 Manganese Dioxide" published by Marcel Dekker, Inc., New York, 1974 (pp. 256-290).

*Primary Examiner*—Raymond Alejandro
(74) *Attorney, Agent, or Firm*—Russell H. Toye, Jr.

(57) ABSTRACT

An alkaline battery cell with improved high rate and high power discharge capacity is provided, without sacrificing capacity at low rate and low power, by adding at least a second anode or cathode, reducing the effective maximum electrode thicknesses, and increasing the active material density in one or more electrodes.

47 Claims, 7 Drawing Sheets

U.S. PATENT DOCUMENTS

| | | |
|---|---|---|
| 3,364,073 A | 1/1968 | Balaguer |
| 3,490,951 A | 1/1970 | George |
| 3,496,018 A | 2/1970 | Hamlen et al. |
| 3,738,869 A | 6/1973 | Zaleski |
| 3,787,243 A | 1/1974 | Zaleski |
| 4,011,103 A | 3/1977 | Kordesch |
| 4,016,339 A | 4/1977 | Gray et al. |
| 4,042,756 A | 8/1977 | Goebel et al. |
| 5,489,493 A * | 2/1996 | Urry ......................... 429/224 |
| 5,639,578 A | 6/1997 | Urry |
| 5,716,729 A | 2/1998 | Sunderland et al. |
| 5,869,205 A | 2/1999 | Mick et al. |
| 6,150,052 A | 11/2000 | Urry |
| 6,207,322 B1 | 3/2001 | Kelsey et al. |
| 6,261,717 B1 | 7/2001 | Luo et al. |
| 6,342,317 B1 | 1/2002 | Patel et al. |
| 6,410,187 B1 | 6/2002 | Luo et al. |
| 2001/0028976 A1 | 10/2001 | Treger et al. .................. 429/56 |
| 2003/0162086 A1 | 8/2003 | Longhi, Jr. et al. ........... 429/94 |

FOREIGN PATENT DOCUMENTS

| | | |
|---|---|---|
| DE | 1036156 | 7/1966 |
| JP | 49-11504 | 3/1970 |
| JP | 22653-1970 B | 7/1970 |
| JP | 52-142237 A | 11/1977 |
| WO | WO 00/33397 | 6/2000 |
| WO | WO 01/97298 | 12/2001 |
| WO | WO 01/97302 | 12/2001 |
| WO | WO 01/99214 * | 12/2001 |

* cited by examiner

BATTERY WITH INCREASED ELECTRODE INTERFACIAL SURFACE AREA AND INCREASED ACTIVE MATERIALS

CROSS-REFERENCE TO RELATED APPLICATIONS

The present application is a continuation in part of application Ser. No. 10/251,002, filed Sep. 20, 2002, and issued as U.S. Pat. No. 6,869,727 on Mar. 22, 2005, entitled "Battery with High Electrode Interfacial Surface Area," which is incorporated herein in its entirety by this reference.

BACKGROUND

This invention relates to electrochemical battery cells, particularly alkaline zinc-manganese dioxide cells.

Batteries containing electrochemical cells are used as power sources for electronic devices. An ideal battery would be inexpensive and have unlimited discharge capacity, regardless of power level, temperature, or operating conditions. It would also have an unlimited storage life, be safe under all conditions, and be impossible for the user to misuse or abuse. While such an ideal battery is not possible, battery manufacturers continue to strive to design and make the ideal battery. In a practical battery, there are tradeoffs and compromises that must be made. The requirements of the electronic devices that will be powered by a battery are important factors in battery and cell design. For example, many devices have battery compartments that limit the size and shape of the battery or batteries, and the discharge characteristics of the battery/batteries must be sufficient to operate the device under expected conditions of use.

Some equipment manufacturers continually try to increase the capabilities and number of features, while reducing the sizes, of electrical devices. This has resulted in ever-increasing demands for batteries that will provide higher power without unacceptable sacrifices in other battery performance characteristics, such as long discharge life (high capacity), long storage life, resistance to leakage, and ease and cost of manufacture. This trend in increasing power requirements is evident in portable devices with consumer replaceable batteries. While the trend is toward batteries with better performance on high rate (i.e., current) and high power discharge, not all devices have such high rate/high power requirements, and there is also a need for batteries with high capacity at low to moderate discharge rate and power.

Achieving high battery capacity is especially challenging on high rate and high power discharge. Batteries are able to deliver only a fraction of their theoretical capacity (the maximum capacity that would result if the discharge reactions of the active materials in the battery were 100 percent efficient), and that fraction (discharge efficiency) decreases as the discharge rate and power increases.

There are many factors that contribute to the discharge efficiency of batteries and the cells they contain. One factor is the interfacial surface area between the electrodes. Increasing the interfacial surface area generally has positive effects on current density, internal resistance, concentration polarization, and other characteristics that can affect discharge efficiency. In the past, electrode interfacial surface area has been increased in various ways, including the use of irregular interfacial electrode surfaces, and multiple cavities for one electrode contained within the other. Examples of such cell designs are found in U.S. Pat. Nos. 6,410,187, 6,342,317, 6,261,717, 6,235,422, 5,869,205, and International Patent Publication No. WO 02/17414. Spirally wound electrode designs have also been used in cells to emphasize electrode interfacial surface area in order to enhance efficiency and capacity when discharged at high rate.

Another factor that can contribute to discharge efficiency is electrode porosity (i.e., the percentage of an electrode's volume that is not taken up by solid materials). Increasing the amount of electrolyte solution in this way can improve ion transport within the electrode, thereby reducing polarization of the electrode, especially during high rate and high power discharge. Examples of cells in which discharge efficiency has been improved by increasing electrode porosity are found in U.S. Pat. No. 6,207,322 and International Patent Publication No. WO 01/99214.

Electrode conductivity is another factor that can contribute to discharge efficiency. The more conductive the electrode, the lower the internal resistance of the cell. Electrode conductivity can be improved by increasing the proportion of highly conductive material in the electrode, such as by increasing the ratio of graphite to $MnO_2$ in an alkaline $Zn/MnO_2$ cell. The internal resistance of the cell can also be decreased to a point by increasing the contact area between the electrode and its current collector. This can be accomplished by changing the size and shape of the current collector. Examples of this approach are found in International Patent Publication Nos. WO 01/97302 and WO 01/97298.

While manufacturers have often provided different battery types, with different electrochemical systems, structural features, and formulations, to meet the varying needs of battery powered devices, it is desirable to meet as broad a range of device requirements as possible with a single battery type. Doing so tends to keep costs lower and avoid user confusion as to which battery type to use in a particular device. However, the above means of improving high rate and high power discharge performance are often at the expense of the quantity of active materials that can be put into a cell with fixed external dimensions and, therefore, its theoretical capacity. For example, increasing the electrode interfacial surface area requires more separator between the electrodes, increasing either the electrode porosity or the proportion of highly conductive material reduces the density of the active material in the electrode, and increasing the volume of the current collector leaves less volume for the electrodes. All of these tend to reduce the amount of active materials in the cell and, thereby, reduce the maximum capacity that the cell can deliver.

In addition to adversely affecting capacity at lower discharge rate and power, the above approaches to improving discharge efficiency may have one or more additional drawbacks, such as more complex cell designs, more difficult manufacturing processes, increased manufacturing variability, higher scrap, greater susceptibility to quality problems, and increased manufacturing costs. The above approaches may also be difficult to adapt to existing cell designs, processes, and equipment, requiring large capital expenditures for commercialization.

Batteries containing alkaline cells having a zinc-containing negative electrode (anode), a manganese dioxide positive electrode (cathode), and an alkaline electrolyte (e.g., an aqueous solution containing potassium hydroxide), particularly primary batteries, are popular power sources for electronic devices powered by consumer replaceable batteries. Though the principles above are applicable to electrochemical cells in general, they are particularly pertinent to consumer replaceable primary alkaline cells and batteries, to which industry standards that external specify sizes and shapes apply.

In view of the above, an object of the present invention is to provide an electrochemical battery cell, particularly a primary alkaline $Zn/MnO_2$ battery cell with excellent high rate and high power discharge characteristics as well as excellent capacity on moderate and low rate and power discharge.

Another object of the present invention is to provide a primary alkaline $Zn/MnO_2$ electrochemical battery cell that is inexpensive and easy to manufacture, has high capacity, performs well under expected temperature and operating conditions, has long storage life, is safe, and is not prone to failure as a result of misuse or abuse by the user.

It is also an object of the present invention to provide an economical battery cell with electrodes having a high interfacial surface area and high active material density in the electrodes that can be commercialized with a minimum of capital expenditure.

SUMMARY

The above objects are met and the above disadvantages of the prior art are overcome by an electrochemical battery cell of the present invention. In one aspect the present invention is directed to a primary electrochemical battery cell comprising a container, a first positive electrode comprising a manganese oxide and a carbon, a first negative electrode comprising zinc, a separator disposed between adjacent positive and negative electrodes, and an electrolyte comprising an aqueous alkaline solution. The cell comprises a second of at least one of the positive and negative electrodes, and all first and second positive and negative electrodes are disposed coaxially with respect to each other, with alternating polarities, such that each of the first and second electrodes has at least one surface that interfaces with another of the coaxial electrodes through the separator. The solid materials content in at least the first positive electrode is greater than 60 percent but not greater than 80 percent by volume.

In another aspect the present invention is directed to a primary electrochemical battery cell comprising a container, a first positive electrode comprising a manganese oxide and a carbon, a first negative electrode comprising zinc, a separator disposed between adjacent positive and negative electrodes, and an electrolyte comprising an aqueous alkaline solution. The cell comprises a second of at least one of the positive and negative electrodes, and all first and second positive and negative electrodes are disposed coaxially with respect to each other, with alternating polarities, such that each of the first and second electrodes has at least one surface that interfaces with another of the coaxial electrodes through the separator. The solid materials content in at least the first positive electrode is from greater than 60 to 80 percent by volume, and the ratio of the total theoretical capacity to the total interfacial surface area of coaxial positive electrodes is 150 mAh:1 $cm^2$ to 220 mAh:1 $cm^2$.

In yet another aspect the present invention is directed to a primary electrochemical battery cell comprising a container, a first positive electrode comprising a manganese oxide and a carbon, a first negative electrode comprising zinc, a separator disposed between adjacent positive and negative electrodes, and an electrolyte comprising an aqueous alkaline solution. The cell comprises a second of at least one of the positive and negative electrodes, and all first and second positive and negative electrodes are disposed coaxially with respect to each other, with alternating polarities, such that each of the first and second electrodes has at least one surface that interfaces with another of the coaxial electrodes through the separator. The solid materials content in at least the first positive electrode is from greater than 60 to 80 percent by volume, and the ratio of the interfacial surface area to the volume of each of the coaxial positive electrodes is 5.6 $cm^2$:1 $cm^3$ to 6.9 $cm^2$:1 $cm^3$.

These and other features, advantages and objects of the present invention will be further understood and appreciated by those skilled in the art by reference to the following specification, claims and appended drawings.

Unless otherwise specified, the following definitions and methods are used herein:

(1) "Electrodes disposed coaxially with respect to each other" means that the coaxial electrodes are disposed such that each inner electrode is radially completely surrounded by the electrode immediately outside of it; coaxial electrodes may, but do not necessarily, have a common longitudinal axis; spirally wound electrodes are not considered to be disposed coaxially with respect to each other.

(2) "Coaxially disposed electrodes with alternating polarities" means that the radial sequence of the coaxial electrodes is such that adjacent coaxial electrodes have opposite polarities, alternating between positive and negative (e.g., negative-positive-negative, positive-negative-positive, negative-positive-negative-positive, and positive-negative-positive-negative).

(3) "Solid materials" means materials that do not have significant solubility (i.e., less than 1 percent based on the weight of water) in aqueous KOH solution anywhere in the range from 20 to 50 percent KOH by weight.

(4) Solid materials content (i.e., percent solids and percent solids packing) can be determined by dividing the sum of the volumes of all of the solid materials in that electrode by the total volume of that electrode and multiplying the result by 100 percent.

(5) The volume of a solid material in an electrode can be determined by dividing the weight of that material by its real density, as determined by helium pychnometry or a comparable method.

(6) "Electrode porosity" means the volume percent of non-solid materials in the electrode and may be determined by dividing the sum of the volumes of non-solid materials (liquids, materials dissolved in the liquids, and entrapped gases) by the total volume of the electrode. When expressed as a percent, the porosity of an electrode is equal to 100% minus the volume percent solids of the electrode.

(7) "Electrode volume" means volume within the exterior surfaces of the electrode.

(8) "Electrode interfacial surface" means the surface of an electrode that is adjacent to an electrode of opposite polarity. While the shapes and sizes of interfacial surfaces of adjacent electrodes are usually very similar to one another in order to most efficiently use the internal volume of the cell, one electrode may extend slightly beyond the other to prevent internal shorting and accommodate variability in manufacturing. The interfacial surface area is the area of the entire interfacial surface, including any portion thereof that may extend beyond the corresponding interfacial surface of the adjacent electrode.

(9) "Effective thickness" of an electrode means the greatest distance from any active material in the electrode to the closest interfacial surface of that electrode.

(10) The theoretical capacity of an electrode is a calculated capacity in ampere hours (Ah) based on the specific capacity (capacities) (in Ah per gram) of the active material (materials) in the electrode, assuming that all of the active material (materials) reacts according to the nominal discharge reactions. Unless otherwise indicated or apparent, the specific capacity used herein for electrolytic manganese dioxide the specific capacity is 0.379 Ah/g, assuming that all of the manganese reacts to $Mn^{+2.67}$ (an average of about 1.33 electrons per Mn atom), and the specific capacity of zinc is 0.820 Ah/g.

(11) Objects with circular cylindrical shapes include objects with minor deviations in their surfaces, such as those due to normal irregularities in the surface (e.g., roughness) and minor tapering (e.g., as is common to facilitate the electrode molding process or the mating of two adjacent electrode surfaces during assembly). Circular cylindrical shapes do not include shapes with intentionally formed lobes, nodules, ridges, protrusions, grooves, flutes, channels, notches, dimples, corrugations, ripples, and the like.

Unless otherwise specified herein, all disclosed characteristics and ranges are as determined at room temperature (20-25° C.).

DESCRIPTION

Figure 1:
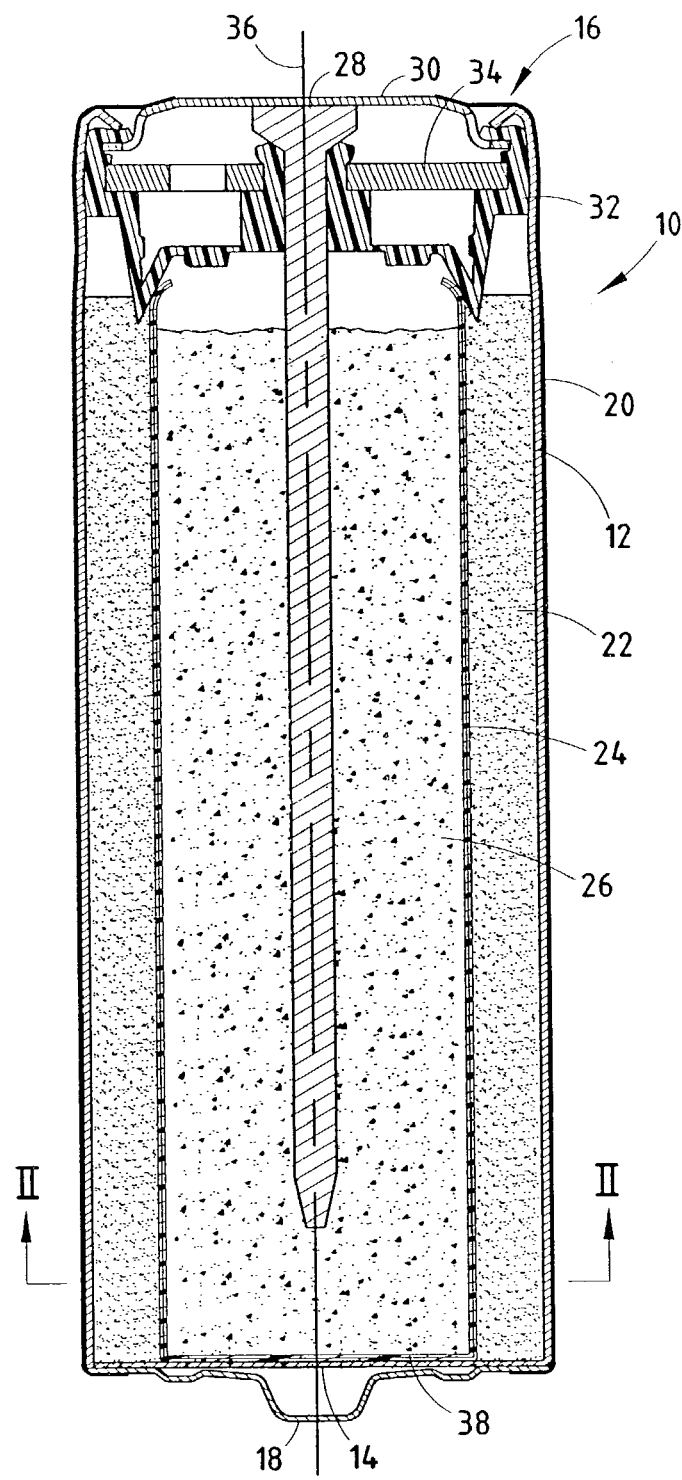
FIG. 1 is a cross-sectional view of a conventional battery cell taken along the longitudinal axis of the cell.
Figure 3:
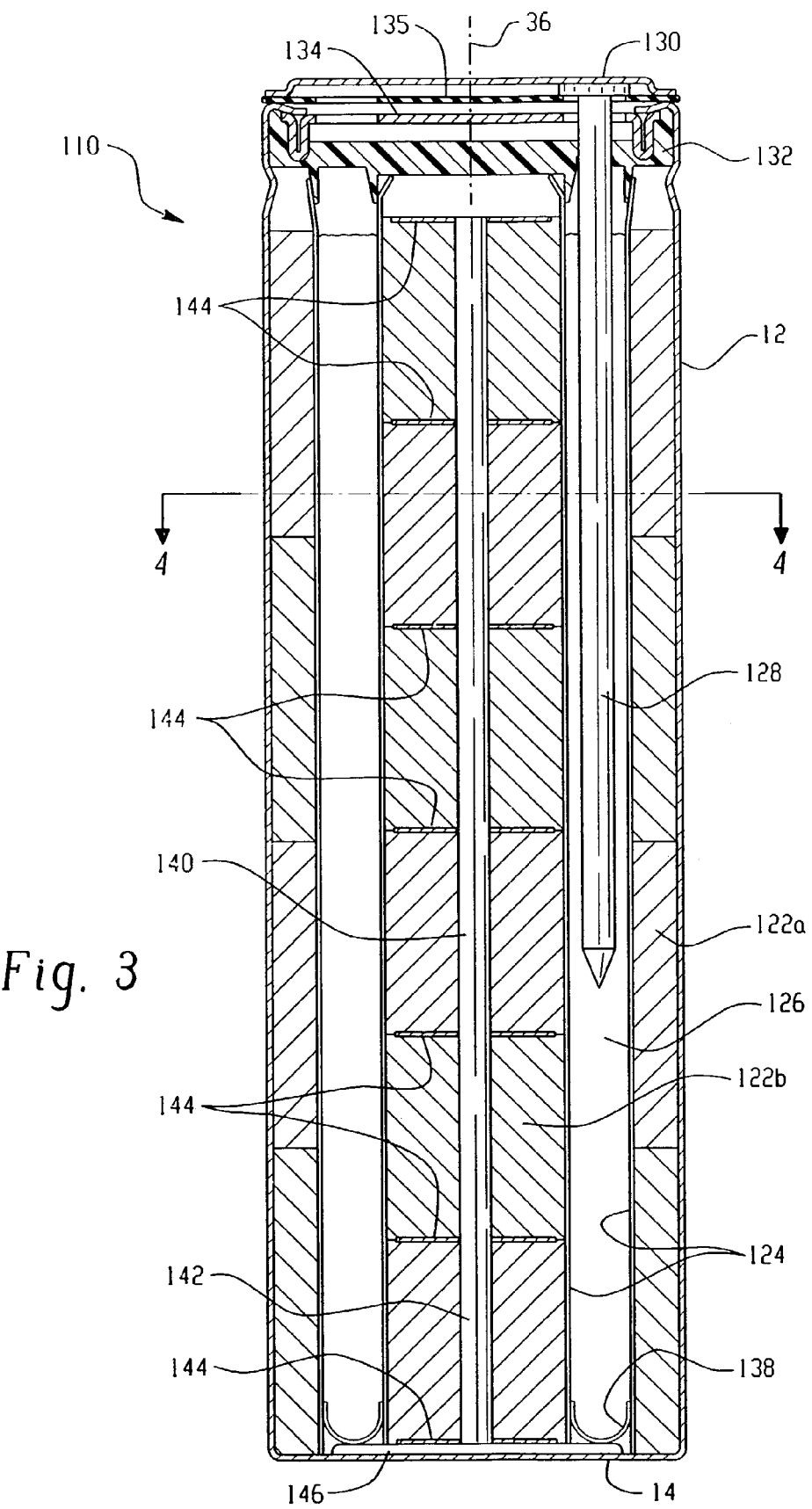
FIG. 3 is a cross-sectional view of a first embodiment of the battery cell of the invention, taken along the longitudinal axis of the cell.

The alkaline battery cell of the invention is a cell with a large electrode interfacial surface area that results from splitting the electrode material of one electrode of a conventional cell, such as the cell shown in FIG. 1, into two separate electrodes, such as the cell shown in FIG. 3.

Referring to FIG. 1, a conventional primary alkaline electrochemical battery cell 10 is shown. Cell 10 includes a housing, comprising a can with a side wall 12, a closed bottom end 14, and an open top end 16. A positive terminal cover 18 is welded or otherwise attached to can bottom 14. Alternatively, can bottom 14 may be formed to include the shape of positive terminal cover 18 in order to function as the positive terminal and eliminate the need for a separate cover. Assembled to the open top end 16 of the can is a cover and seal assembly and a negative terminal cover 30. A plastic film label 20 or other jacket may be formed about the exterior surface of the can side wall 12. Label 20 may extend over the peripheral edges of positive and negative terminal covers 18 and 30. A positive electrode (cathode) 22 is formed about the interior surface of the can. Cathode 22 is in direct contact with a portion of the can, and the can functions as the cathode current collector, providing electrical contact between cathode 22 and positive terminal cover 18. A negative electrode (anode) 26 is disposed within a cavity in cathode 22, with a separator 24 between cathode 22 and anode 26. A layer of separator 38 is also disposed between the anode 26 and the can bottom 14. An anode current collector 28 extends from negative terminal cover 30 into anode 26 to provide electrical contact between anode 26 and cover 30. An annular seal 32 is disposed in the open end 16 of the can to contain the electrode materials and electrolyte in the can. An inner cover 34 provides compressive support for seal 32 to achieve the desired level of resistance to leakage of materials from cell 10. Seal 32 also electrically insulates negative terminal cover 30 from the side wall 12 of the can. The cathode 22 and the anode 26 are coaxially disposed with respect to each other, sharing the longitudinal axis 36 of the cell 10 as a common axis.

Figure 2:
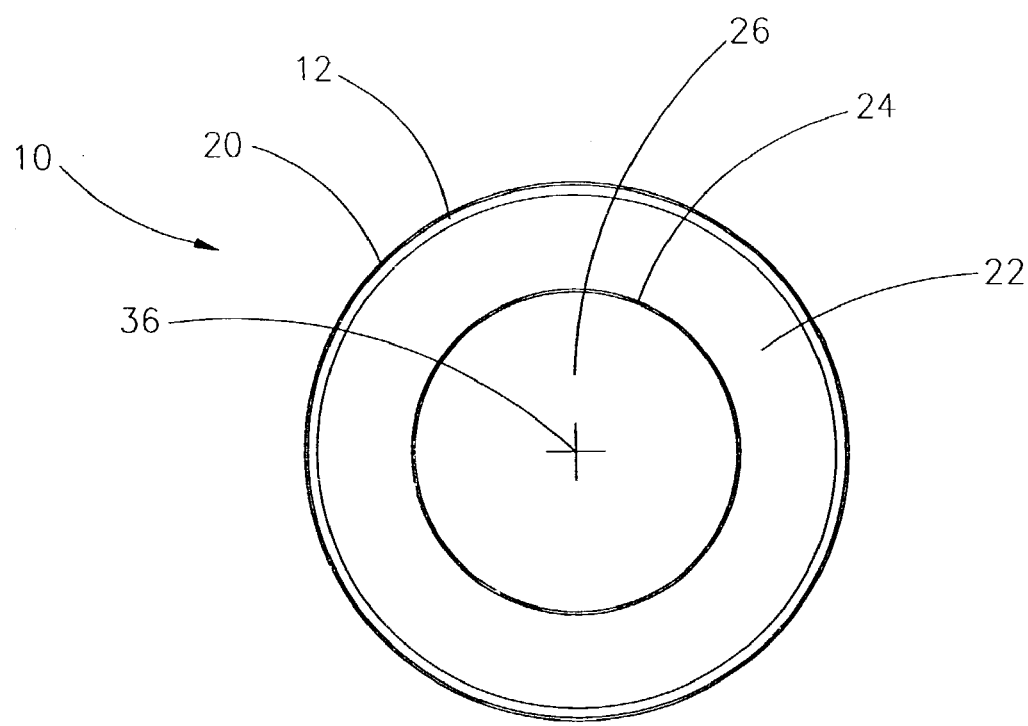
FIG. 2 is a cross-sectional view of the battery cell in FIG. 1, taken perpendicular to the longitudinal axis of the cell, at II-II.

FIG. 2 is cross-sectional view of the cell 10 in FIG. 1 taken at II-II. Cathode 22 has a hollow circular cylindrical shape with an internal surface that is generally smooth. The external surface of cathode 22 conforms generally to the shape of the internal surface of can side wall 12. The external surface of cathode 22 may be in direct contact with can side wall 12. Cathode 22 also has an internal surface, which defines a cavity. Anode 26 is disposed within the cylindrical cavity defined by the internal surface of cathode 22. Separator 24 is disposed between cathode 22 and anode 26.

An example of the cell of the invention is shown in FIG. 3. Cell 110 is similar to cell 10, but it has two cathodes, outer cathode 122a disposed adjacent to the inner surface of the can side wall 12, and central cathode 122b disposed centrally in the cell. A single anode 126 is disposed in a cavity defined by the cathodes 122a and 122b. Separator 124 is disposed between the anode 126 and each of the cathodes 122a and 122b.

Because the anode 126 is not centrally disposed in the cell, the anode current collector 128 is repositioned from the longitudinal axis 36 to extend into the repositioned anode 126. Cell 110 has a separate current collector 140 for the central cathode 122b. The central current collector 140 is in electrical contact with the can bottom 14. The current collector 140 includes an electrically conductive central pin 142 and several electrically conductive horizontal plates 144, in electrical contact with the pin 142, to provide additional contact surface area with the cathode 122b. The current collector 140 also has an electrically conductive base 146 to facilitate connecting the current collector 140 to the can bottom 14. A bottom insulator 138 is disposed in the bottom of the cavity formed between the central and outer cathodes 122a and 122b to electrically insulate the anode 126 from the can bottom 14 and current collector base 146.

Cell 110 also has an annular seal 132, an inner cell cover 134 and a negative terminal cover 130 that perform the same functions as the corresponding components of cell 10. Because the cell cover 134 is in electrical contact with the inwardly crimped tope edge of the can, an insulating washer 135 is disposed between the cell cover 134 and negative terminal cover 130. The terminal cover 130 is welded to the top of the anode current collector 128 to retain it in position on the cell 110. A jacket and positive terminal cover, not shown in FIG. 3, may also be included in the embodiment illustrated in FIG. 3.

Figure 4:
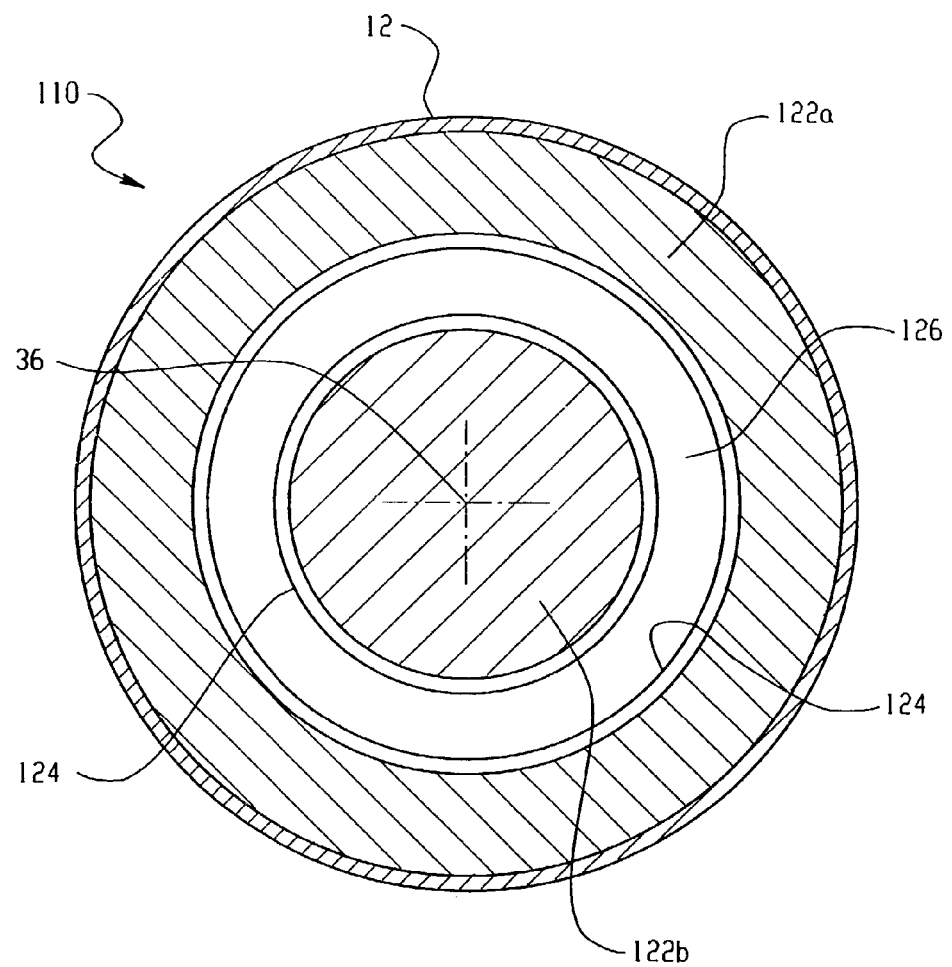
FIG. 4 is a cross-sectional view of the embodiment of the battery cell in FIG. 3, excluding the current collector of the central electrode and the anode current collector, taken perpendicular to the longitudinal axis of the cell.

FIG. 4 is a cross-sectional view of cell 110 in FIG. 3 (excluding current collectors 128 and 140), taken perpendicular to the longitudinal axis of the cell. The cathodes 122a and 122b and anode 126 are coaxially disposed about longitudinal axis 36.

Splitting the cathode material into two coaxial electrodes, as in cell 110, reduces the current density at the electrode interfacial surfaces, thereby improving the discharge efficiency compared to that of cell 10. The improvement in efficiency increases as the discharge rate or power increases. Because the electrode interfacial surface area is increased, more separator material is needed to insulate the anode from the cathodes. The additional volume of separator reduces the volume available in the cell for electrode materials, partially offsetting any positive effects on discharge capacity resulting from an increased interfacial surface area. The reduction in electrode volumes is particularly significant on low rate and low power discharge, where the effects of increased efficiency on discharge capacity may be small.

An additional feature of the present invention is low effective electrode thicknesses. By reducing the thicknesses of the electrodes, the effects of electrode polarization during discharge are also reduced, because the maximum distance that ions involved in the discharge reactions must move is shortened. If nothing else were changed, the reduced electrode thickness would contribute further to improving the cell's discharge efficiency, but the theoretical capacity of the cell with increased electrode interfacial surface area would still be reduced because of smaller electrode volumes.

Reducing the electrode thicknesses provides an opportunity to compensate, at least partially, for the reduction in total electrode volume in several ways. Because the effects of electrode polarization are less in thinner electrodes, high electrode porosity is not as important for good efficiency on high rate and high power discharge. Therefore, the solids contents of the electrodes can be increased, increasing the amount of active materials in the cell. The thinner electrodes also reduce the need for inert conductive material in the electrode to achieve the desired low electrode resistivity, so the amount of conductive material (e.g., graphite) can be reduced and the amount of active material (e.g., manganese dioxide) increased. In these ways the effect of increased separator volume to reduce the theoretical capacity of the cell can be at least partly offset by the effects of increasing the percentage of active materials in either or both the cathode(s) and the anode(s).

For the reasons above, reduction of theoretical capacity that accompanies an increase in electrode interfacial surface area is minimized, and can actually be increased, in cells made according to the invention compared to conventional cells with a single anode and a single cathode. Thus, the present invention not only provides a cell with improved discharge capacity on high current and high power discharge, but it at least minimizes any reduction in cell capacity on very low rate and low power discharge as well.

The cell shown in FIGS. 3 and 4 and described above is one embodiment of the invention. It has two cathodes and one anode, with one cathode disposed against the inner surface of the can side wall, the other cathode disposed in the center of the cell, and the anode disposed in a cavity between the two cathodes. In another embodiment, the cell could have two coaxial anodes and a single cathode between the anodes. In yet another embodiment, the cell could have two pairs of alternating anodes and cathodes, all coaxially disposed, with either a cathode or anode being disposed against the can side wall. A cell with even more coaxial electrodes may be possible if the width of the cell is large enough.

In some embodiments of the invention, all cathodes have the same composition and all anodes have the same composition. In other embodiments the compositions of like electrodes (cathode and/or anode) can be different. For example, in cell 110 cathode 122a may have different composition than cathode 122b. The difference in composition may be one or any combination of characteristics, including but not limited to: type of active material (e.g., electrolytic vs. chemical $MnO_2$), form of active material (e.g., large vs. small particles), ratio of active material to inert conductive material, electrode porosity, amount and type of binder, and amount and type of additive. In other examples, similar types of differences can exist between two anodes in the cell.

Cells of the invention can be made using conventional types of containers, seals, pressure relief vents, and the like. For example, a primary alkaline $Zn/MnO_2$ cell can have a container comprising a steel can, plated on its exterior surface with nickel. The open end of the cell can be closed with a seal made of a polymeric material such as nylon, polyethylene, polypropylene, and the like. The cell may also have one or more metal covers disposed in the open end of the cell such that, when the top edge of the can is crimped inward and/or reduced in diameter, the cover(s) cooperate with the seal and the can to compressively seal the electrodes and electrolyte in the cell. Cell components that may be exposed to the electrodes or electrolyte will be made from materials that will be stable in contact with those materials under expected conditions of cell storage and use. The cell can have a pressure relief vent, which may be disposed in the seal, a cell cover, or a can wall. Each electrode has a current collector to make electrical contact between the electrode and the appropriate cell contact terminal. The can may serve as a current collector for an electrode formed against the inner surface of the can, in which case a coating containing carbon (e.g., graphite) can be applied to the can surface to improve electrical contact with the electrode. Suitable graphite coatings include LB1000 and LB1090 (TIMCAL America, Ltd., Westlake, Ohio, USA), Eccocoat 257 (W.R. Grace & Co.), and ELECTRODAG® 109 and 112 (Acheson Colloids Company, Port Huron, Mich., USA). Alternatively, the outer electrode may be electrically insulated from the can and have a separate current collector. The cell can also have one or more covers that serve as cell contact terminals. When the can is in electrical contact with an electrode, the can bottom may be formed in the shape of a contact terminal, thereby eliminating the need for a separate cover for that purpose.

At least one cathode of the cell of the invention contains a manganese oxide as a positive active material. The manganese oxide may be any manganese oxide suitable as an active material in an alkaline zinc-manganese oxide cell. Manganese oxides suitable for use in the invention generally have a molecular formula close to $MnO_2$, and may therefore be referred to as manganese dioxide, though they typically contain small amounts of manganese oxides with manganese valences other than +4. Examples of manganese oxides that may be used are natural manganese dioxides (NMD), chemical manganese dioxides (CMD), and electrolytic manganese dioxides (EMD). EMD typically has the greatest theoretical capacity because of its relatively high level of purity and high density. Suitable EMD may be obtained from Kerr-McGee Chemical Corp. (Oklahoma City, Okla., USA) or Erachem Comilog, Inc. (Baltimore, Md., USA). It may be desirable for the EMD to have a high potential (e.g., a pH-voltage at least 0.86) and a low potassium content (e.g., less than 200 ppm), as disclosed in International Patent Publication No. WO 01/11703. The cell may also contain another positive active material besides a manganese oxide, either in the same cathode as the manganese oxide or in a separate cathode. Suitable co-cathode materials are compatible with the manganese oxide used in the cell and may be selected to give the cell certain desired voltage or discharge characteristics. Examples of active materials that may be used in combination with manganese oxides include, but are not limited to, other manganese oxides, silver oxides, nickel oxyhydroxide and the like.

Because manganese oxides have relatively high electrical resistivities, a manganese oxide-containing cathode of the invention will generally include an inactive material that is highly conductive. Carbon materials, such as graphites and graphitized carbons, are often used. Suitable graphites include natural and synthetic graphites and can be in a variety of forms, including powders, flakes, fibers, and the like. Suitable graphite powders can be obtained from Timcal America (Westlake, Ohio, USA) and Lonza, Ltd. (Switzerland). A suitable expanded graphite is disclosed in International Patent Publication No. WO 99/00270 and may be obtained from Superior Graphite Co. (Chicago, Ill., USA). In general, less graphite is needed when it is in the form of flakes and fibers than when the particles are more spherically shaped, though graphite flakes and fibers generally cost more than graphite powder. Blends of different types of graphites may also be used.

Cathodes used in cells of the invention can include a small amount of binder for strength. This can become more important as the thickness of the electrode is reduced. Suitable binder materials include polytetrafluoroethylenes, polyethylenes, diblock copolymers of styrene, ethylene and propylene, polyacrylic acids, and poly (acrylic acid-co-sodium-4-styrene sulfonate). Binder materials may be used singly or in combination, such as a blend (e.g., 3:1 by weight) of polytetrafluoroethylene and polyacrylic acid. It is generally desirable to keep the amount of binder to a minimum, but the amount used in any given electrode will vary, based on how much is needed to achieve the necessary strength for manufacturing process used. If a binder is needed, the amount is typically in the range from about 0.1 to 6.0 weight percent, more typically 0.2 to 2.0 weight percent.

Small amounts of additives, such as barium sulfate, titanium dioxide, and n-type titanium dioxide, may also be included in the cathode, e.g., to improve discharge performance. Niobium-doped titanium dioxide, with a resistivity less than 10 ohm-cm, as disclosed in International Patent Publication No. WO 00/79622, can be used as an additive for maximizing high rate discharge performance.

A small amount of water (e.g., 1.5 to 8.0 percent, based on the weight of the solid cathode materials), either with or without electrolyte salt dissolved therein, is often mixed with the dry cathode ingredients to achieve the desired consistency for cathode forming, depending on the forming process. For example, for impact molding 6 to 8 percent water can be used, and for ring molding 1.5 to 6 percent, more typically 2 to 4 percent, can be used.

To minimize the reduction in cell theoretical capacity while increasing the electrode interfacial surface area, the volume percent solids in at least one cathode will be greater than 60 volume percent. If the solids content is 60 volume percent or less, capacity on low current and low power discharge will suffer. A higher solids level, e.g., above 70 volume percent, will result in even better low rate discharge capacity. At least 75 percent solids packing is preferred, and between 76 and 78 volume percent solids is practical with equipment commonly in use. Levels above 78 percent solids can be more difficult to achieve due to the normal sizes and shapes of the particles of cathode materials, but levels as high as about 80 volume percent solids can be achieved by carefully selecting the shapes and sizes of the solid particles.

In a cell with a cathode containing EMD and graphite, the ratio of EMD to graphite can vary considerably, e.g., from as low as about 8:1 to about 30:1 or higher. The higher ratios tend to favor low current and low power discharge, where theoretical cell capacity is more important, while the lower ratios tend to favor high current and high power discharge, where internal resistance is more important. In the present invention, where excellent performance is desired on both ends of the discharge spectrum, a weight ratio of EMD to graphite of about 12:1 to 30:1 can be used. Under some circumstances a ratio of at least 15:1 or at least 18:1 is desirable. Using graphite with particles in the shape of flakes, such as an expanded graphite, can reduce the amount of graphite needed for a good conductive matrix within the cathode. Such a graphite is generally needed to achieve the higher EMD to graphite ratios.

In addition to contributing to the cell's theoretical capacity, a high solids content in the cathode can also be advantageous because, in general, as the percent solids increases, the strength of the cathode increases as well. This tends to offset a trend toward lower cathode strength as the cathode thickness is reduced. By increasing the solids content, the need for a binder in the cathode can be reduced or avoided, and a lower binder level means that more active material can be put in the cathode mixture.

The anode of an alkaline $Zn/MnO_2$ cell can comprise a mixture of gelled zinc particles. The zinc may be in powder or flake form, or a combination of the two. An unamalgamated zinc alloy comprising bismuth, indium, and aluminum may be advantageous. Zinc powder, preferably having a $d_{50}$ of about 110 µm, may be obtained from Umicore (Brussels, Belgium), and zinc flake (e.g., grade 5454.3) may be obtained from Transmet Corp. (Columbus, Ohio, USA). The anode also comprises water, potassium hydroxide electrolyte, and a gelling agent. Acrylic acid in the 100% acid form, such as CARBOPOL® 940 from Noveon, Inc. (Cleveland, Ohio, USA) is a common gelling agent. Small amounts of other materials may also be added to the anode mixture and/or electrolyte to minimize gas generation in the cell and/or enhance discharge performance. Examples of such materials include $In(OH)_3$, ZnO, and sodium silicate.

The total KOH concentration in the electrolyte in the completed, undischarged cell can be from about 25 to about 50 weight percent, generally from about 36 to about 40 weight percent. The lower part of this range may be desirable for good high current and high power discharge performance.

As with the solids content of the cathode, the amount of solids in the anode is a consideration in optimizing cell discharge performance, though to a lesser degree because the anode in an alkaline $Zn/MnO_2$ may be less sensitive to polarization than the cathode. As with the cathode, a highly porous anode (i.e., low volume percent solids) is not essential for excellent efficiency on high current and power discharge and is detrimental to maximizing capacity on low current and power discharge, due to the thin electrodes. Accordingly, an anode with higher volume percent solids can be used, such as one with at least 27 volume percent solids. In some cases an anode with 31.5 volume percent or more solids may be used. A high solids content usually corresponds to a high zinc content. For this reason, zinc concentrations of 66 weight percent or higher, even as high as 70 to 76 percent by weight, are often possible in cells of the invention, resulting in excellent discharge capacity on high current and power discharge, as well as on low rate and low power discharge.

The relative amounts of anode and cathode in the cell can be about the same as in conventional cells. The anode:cathode ratio, based on theoretical capacities, is often determined based on factors such as performance optimization and cell safety. In alkaline $Zn/MnO_2$ cells, the ratio of anode:cathode often ranges from 0.90:1 to 0.99:1, assuming a 1.33 electron discharge of the EMD. Because cells made according to the invention tend to more efficiently use the active cathode material, it may sometimes be possible to extend this range, such as to 0.85:1 to 0.99:1.

Discharge efficiency is generally enhanced when the active materials in all electrodes are used uniformly. A uniform effective electrode thickness can contribute to this, as can matching the effective thickness of one electrode to the other(s), such that the active materials in one electrode are not used up substantially before those in the other electrode(s). An exception to this is where an excess of positive or negative active material (an anode:cathode ratio not equal to 1) is desired. Accordingly, circular cylindrical shapes, with uniform effective electrode thicknesses, can be advantageous for the electrodes of cylindrical cell, as in cell 110 in FIGS. 3 and 4. In a cylindrical alkaline cell such as cell 110, having outer and central cathodes and an anode disposed between the cathodes, the ratio of radial thicknesses of the outer cathode to the central cathode can be between 0.15:1 and 6.0:1. The active materials in the cell may be more effective used when the ratio of radial thicknesses of the outer cathode to the central cathode is between 0.5:1 and 1.3:1. They may be even more effectively used with the ratio between 0.6:1 and 1.0:1, and more effectively still with the ratio between 0.7:1 and 0.8:1, since the active material in the central cathode may tend to be used more efficiently than the active material in the outer cathode.

Similarly, a ratio of theoretical capacity in the outer cathode to that in central cathode can be between 0.38:1 and 40:1, but the active materials will generally be more effectively utilized when this ratio is from 1.5:1 to 4.0:1 (i.e., 60:40 to 80:20) and even more effectively utilized with the ratio from 2.0:1 to 2.8:1 (i.e., 50:50 to 74:26), such as 2.3:1 (i.e., about 70:30).

In general, the larger the area of the electrode interfacial surface relative to the electrode volume, the better the high rate and high rate discharge efficiency will be, but the greater the separator volume and the lower the theoretical capacity. For an alkaline $Zn/MnO_2$ cell with excellent discharge capacity at both high and low rate and power discharge, the ratio of total cathode interfacial surface area (i.e., the sum of all interfacial surface areas of all coaxial cathodes) to total coaxial cathode volume (i.e., the sum of the volumes of all coaxial cathodes when there is more than one) can be from is $4.0 \text{ cm}^2:1 \text{ cm}^3$ or greater. The improvement in high rate and high power discharge performance may be small when this ratio is less than $5.0 \text{ cm}^2:1 \text{ cm}^3$, and performance will generally be better as the ratio increases. The outer cathode can be difficult to manufacture using conventional alkaline cell cathode molding processes, especially ring molding, when the ratio of total cathode interfacial surface area to total coaxial cathode volume is more than $8.0 \text{ cm}^2:1 \text{ cm}^3$. When this ratio approaches $25 \text{ cm}^2:1 \text{ cm}^3$, high rate and high power discharge performance is especially good, but the loss in theoretical capacity approaches that of a cell with spiral wound electrodes. Therefore, a total coaxial cathode interfacial surface area:volume ratio from $5.6 \text{ cm}^2:1 \text{ cm}^3$ to $6.9 \text{ cm}^2:1 \text{ cm}^3$ can provide good performance in cells that can be made using conventional manufacturing processes for the outer electrode. Each of the coaxial cathodes can have interfacial surface area:volume ratios in this range.

The relationship between interfacial surface area and amount of cathode can also be expressed in terms of cathode capacity. Accordingly, the ratio of theoretical capacity:interfacial surface area for the combined coaxial cathodes can be from 180 mAh:1 $cm^2$ to 220 mAh:1 $cm^2$. This ratio can be lower for the outer cathode (e.g., 80 mAh:1 $cm^2$ to 200 mAh:1 $cm^2$) than for the inner cathode (e.g., 100 mAh:1 $cm^2$ to 240 mAh:1 $cm^2$).

For at least cylindrical alkaline cells in which the outermost coaxial electrode outside diameters are 0.5 inch (12.7 mm) or more, an outer cathode radial thickness of at least 0.030 inch (0.76 mm) can provide a stronger cathode. A radial thickness of at least 0.060 inch (1.52 mm) may be desired in some cathodes made using a ring molding process, though other factors, such as binders and particle size distributions of the solid materials in the cathode can also affect cathode strength.

Cell 110 (FIGS. 3 and 4) has electrodes with generally circular cylindrical shapes, with generally smooth interfacial surfaces. Another embodiment of the invention has at least one irregularly shaped interfacial surface, such as a surface with lobes extending radially therefrom. This increases the interfacial surface area, and thereby the higher rate and power discharge capacity, even though some active materials may not be completely consumed on low current/power discharge. Such irregular surfaces may have radially extending lobes, such as corrugations. Such electrode designs are disclosed in U.S. Pat. No. 6,869,727. The radially extending lobes have convex and concave surfaces. The lobes and the concave areas therebetween can be shaped to facilitate placement of the separator, insure intimate contact between the separator and adjacent interfacial electrode surfaces, and otherwise facilitate cell manufacturing and improve cell quality. For example, both the convex and concave surfaces may have relatively large radii (e.g., no less than 0.030 inch (0.76 mm), or particularly no less than 0.060 inch (1.52 mm)). In some cases each lobe can have a width perpendicular to the radial centerline of the lobe that does not decrease, and may even increase, as the radial distance from the cell's longitudinal axis increases.

In cells made according to the invention, each electrode can have a current collector in physical and electrical contact with the electrode and in electrical contact with a corresponding battery contact terminal. Current collectors are high in electrical conductivity, have sufficient strength to withstand the cell manufacturing processes, and are physically and chemically stable in the internal cell environment under expected conditions of storage and use.

Materials suitable for use for current collectors in cells of the invention are generally suitable for use in other cells having the same type of electrochemistry. For example, in an alkaline $Zn/MnO_2$ cell suitable materials for cathode current collectors can include metals, such as steel, stainless steel, nickel and their alloys. Other conductive materials besides metals, such as electrically conductive plastics, can also be used. The surface of the cathode current collector can be coated with a conductive material, such as a coating containing graphite, to improve contact between the current collector and the cathode, especially when the surface of the current collector is relatively smooth. Cathode current collectors may be in a variety of forms including solid, perforated and expanded sheets, grids, meshes, wires, pins, rods, and the like. Shapes can also vary, depending on factors such as the size, shape, and location of the cathode, the location of the current collector in the cathode, the desired contact surface area, the cell manufacturing process, and so on. Because the cathode can have a relatively high resistivity, the contact surface area between the cathode and the current collector is often relatively high compared to that of a current collector for an anode containing a highly conductive zinc alloy.

Suitable materials for anode current collectors in alkaline $Zn/MnO_2$ cells can include copper, brass, and their alloys. Anode current collectors are generally alloyed and/or coated with a metal having a high hydrogen overvoltage, such as zinc, indium, or tin, in order to reduce hydrogen gas generation during storage and discharge of the cell, especially when the zinc in the anode is unamalgamated. As with cathode current collectors, anode current collectors can also have a variety of forms and shapes. Because the anode can have a relatively high conductivity, having a large current collector surface area in contact with the anode is not usually as important as in the cathode, and a smaller surface area helps to reduce gassing. Accordingly, a single, low-surface area collector, such as a wire, pin, nail or rod, can be suitable as a current collector for each anode.

The cell container is often used as the current collector for the adjacent electrode, as in cell 10 in FIG. 1. This can be advantageous because an additional component, taking up additional volume inside the cell, is not needed as a current collector. Using the can as a current collector is especially advantageous when the adjacent electrode is the cathode, rather than the anode. A large contact surface area is more important for the cathode and is not as susceptible to gassing as an anode current collector.

When a cathode is not formed against the inner surface of the can, for example, when a cathode is centrally located in the cell, a separate current collector is needed, though this current collector may be fastened to, or at least electrically connected to the can. It is desirable to design the current collector to have as large a contact surface area with the cathode as practical, while minimizing the current collector volume. Forms such as metal screens and thin metal foils can be useful for this purpose.

Contact must be maintained between the electrode and the current collector throughout discharge. Some electrodes, such as cathodes containing $MnO_2$ as an active material, can expand during discharge. When a $MnO_2$ cathode is the outer electrode, with the can as the current collector, this is not a problem, since the expansion forces the outer portion of the cathode more tightly against the can. However, when a $MnO_2$ cathode has a current collector within the cathode and extending parallel to the longitudinal axis of the cell, the cathode tends to pull away from the current collector as it expands. For this reason, a current collector disposed in the radially outer portion of the cathode help maintain contact between the cathode and the current collector as the cell discharges. For example, the collector may have a metal mesh component generally parallel to and located either at (i.e., on or just below) the radially outer surface of the electrode or within the radially outer half of the cathode. Current collectors can also have segments that extend radially in order to maintain contact during discharge. Such current collectors can also have one or more other components, such as a central pin, to form part of the electrical connection with the cell's negative contact terminal and/or to electrically join the other components of the current collector together.

It is desirable that the resistivity of the cathode in combination with its current collector be low to achieve high discharge efficiency. Since the resistivity of the cathode and the electrical resistance between the cathode and current collector contribute to the total resistivity, both of these parameters can be considered separately. In general, a cathode resistivity of no greater than 0.5 ohm-cm is desirable, though the effects on theoretical capacity must also be considered. A cathode-current collector electrical resistance of less than 3 milliohms per gram of EMD and a resistance of less than 2 milliohms per $cm^2$ of contact surface area are both indications of good electrical contact between the cathode and current collector. The electrical resistance of both the cathode and the cathode current collector can be determined from impedance spectroscopy, according to the following method, described by R. Barnard et al., *Journal of Applied Electrochemistry*, 17, 165-183 (1987):

(1) Drill a hole in the side wall of the container of the cell to be measured.

(2) Insert a pipette type zinc reference electrode through the hole in the cell container to the desired location in the cell, depending on the determination to be made:
   (a) to determine the resistance between the can and the cathode, position the reference electrode tip at the outer surface of the outer cathode;
   (b) to determine the resistance between the inner cathode and its current collector, position the reference electrode tip at the surface of the inner cathode current collector;
   (c) to determine the bulk resistance of a cathode, position the reference electrode tip at the surface of the cathode interfacing the separator; the bulk cathode resistance is the difference between the resistance measurement obtained at this point and the resistance measurement obtained from step (2)(a) or (2)(b), depending on which cathode resistance is being determined.

(3) Connect a frequency response analyzer (e.g., SOLARTRON™ FRA Model 1250) coupled with a potentiostat (e.g., SOLARTRON™ Potentiostat/Galvonostat Model 1286) to both the reference electrode and the positive terminal of the cell.

(4) Apply a small amplitude (10 mV—to keep a linear response with the high signal to noise ratio of the system) alternating current over a frequency range of 1 to 65,000 Hz.

(5) From a Nyquist plot (imaginary component vs. real component of impedance) of the data from step (4) for each of the reference electrode positions in step (2), determine the electrical resistance value from the intersection of the plot with the real axis at high frequency (usually greater than 1000 Hz).

To increase discharge efficiency, current density at the cathode-current collector contact surface can be reduced. This can be achieved when the contact surface is large, such as when the cathode is adjacent to the can side wall and the can functions as its current collector. However, when the cathode is not the outer electrode in the cell, a current collector with a large contact surface area can have a large volume. As an alternative, a current collector with a smaller volume and lower current collector contact surface area can be used and the resistivity of the cathode reduced to compensate for the higher current density, e.g., by reducing the EMD to carbon ratio. For example, an EMD: carbon ratio no greater than 18:1, and as low as 12:1, can be used. A range from 14:1 to 16:1 may a useful compromise.

Another way to maximize discharge efficiency is to minimize the contact resistance between the electrodes and their current collectors. A relatively large current collector surface area is desirable; the less conductive the electrode material, the more important this is. For example, at least about 1.8 $cm^2$ of current collector contact surface area per gram of EMD in the cathode is often desirable in each cathode. However, it is generally desirable to minimize the volume of the current collector to leave as much space as possible for active materials. It has been found that somewhat less contact surface area may be nearly as good if the electrodes are thin enough. Electrode thickness is generally directly related to the diameter of the cell. Accordingly, 1.5 $cm^2$ per gram of EMD may be nearly as good in C (LR14) and D (LR20) size cells, and as little as 1.26 $cm^2$ per gram in a smaller diameter AA (LR6) size cell, in cells made according to the invention. This is because the effective electrode thicknesses are less than in conventional bobbin design alkaline cells with single cathodes and anodes.

Two common methods of forming alkaline cell cathodes that may be used to form an outer cathode against the can side wall are ring molding and impact molding. In ring molding one or more (usually 3 to 5) rings are formed and then inserted into the can in a stack (one ring on top of another). Good physical and electrical contact between the can and the cathode are desirable, so the outside diameter of the rings may be made slightly larger than the inside diameter of the can to produce an interference fit. Alternatively the rings may be slightly smaller than the can to facilitate insertion, after which the rings are reformed slightly by applying force to the inside and/or top surface, thereby forcing cathode mixture firmly against the can. In impact molding the desired quantity of cathode mixture is put into the bottom of the can and molded to the desired dimensions using a ram that is inserted into the center of the can. Both methods have advantages and disadvantages.

A ring molded cathode often gives better high rate discharge capacity than an impact molded cathode. However, the cathode rings must be handled between molding and insertion into the can, generally requiring a stronger molded cathode than needed for impact molding. This is more significant in making cells according to the invention, since the electrodes are thinner than in conventional cells of the same size and having cylindrical shapes.

Impact molded cathodes are formed within the can and do not have to be handled separately, so the strength needed is generally much less than for ring molded cathodes. This can give the battery designer more freedom in selecting a shape that will maximize the electrode interfacial surface area. It may also minimize or eliminate the need to strengthen the cathode by means that can adversely affect cell discharge capacity.

Ring and impact molding methods can also be adapted to making cathodes that are not adjacent to the can side wall. However, since these cathodes are not formed against the can wall, an impact-molding process may be more difficult. It may be desirable to form the cathode before it is inserted into the cell. Various methods of assembling the cathode and the current collector can be used, depend on how the cathode is formed, the shapes of both the cathode and the current collector, and the relative locations of the cathode and current collector. For example, the cathode can be formed around a current collector, a current collector can be inserted into a formed collector, a current collector can be formed around the exterior of the cathode, current collector plates can be inserted between cathode rings, or a combination of these methods can be used. Processes for making and assembling cathodes and current collectors in paste-lined carbon-zinc cells can also be adapted to the present invention.

An ionically conductive, electrically insulating separator is used to separate the anodes and cathodes in the cell. Any suitable separator type and assembly process can be used. The following are general considerations in selecting materials, forms, and processes. The material type must be one that is suitable for performing the intended separator functions in a cell of the electrochemical system in which it is to be used. Minimizing the amount of separator material will make the maximum amount of volume available for active materials. The amount of additional separator required for a given increase in electrode interfacial area can be minimized in a number of ways, such as by keeping folds and overlaps in the separator to a minimum.

Other factors may have to be considered in selecting a separator material and process for assembling the separator into the cell. For example, reduced electrode thicknesses can make folding flat sheets of separator to the proper shape more difficult. If the separator is too thin, short circuits through the separator can occur. Clearances for separator insertion or application will generally be smaller than in cells with only one anode and one cathode. While the present invention does not necessarily require a particular separator material, form, or process for assembly, application, or insertion into the cell (referred to below as separator assembly), the above considerations and other advantages and disadvantages must be taken into account. For example, if the separator material is in the form of a sheet, there are advantages and disadvantages to pre-forming the separator to more closely match the shape of the cavity in the cathode and reduce the volume of separator folds before the separator is inserted into the cell. Forming (e.g., by thermoforming) a separator of fairly uniform thickness to closely match the shape of the cavity in the cathode is another alternative. Spraying a coating onto the internal surface of the cathode, before or after it is put into the can is yet another. It may also be desirable to insert separator in some places at different times in the assembly process or to apply separator to one or more of the cathodes before inserting the cathode into the cell.

The anode can be inserted into the cell in any suitable manner. If an anode is flowable when it is put into the cell, it can be dispensed as a liquid to flow by means of gravity to fill the anode cavity. An anode can also be dispensed into the cell under pressure, e.g., by extrusion. If an anode is a solid body, such as a mass of metallic zinc, it can be formed to the desired shape and then inserted into the cell.

The sequence of inserting electrodes, separator and electrolyte into the cell can be varied to best suit the compositions and shapes of those components. In one embodiment, an outer cathode can be put into the cell and lined with separator, a flowable anode dispensed into the central cavity, and a central cathode, containing a current collector and covered on its interfacial surfaces with separator, inserted into the center of the cell, forcing anode material up and around the central cathode. In another embodiment, an outer cathode can be formed against the can side wall, a central cathode formed around a central current collector attached to the can bottom, the interfacial surfaces of both cathodes lined with separator, and a flowable anode dispensed into the cavity between the cathodes.

EXAMPLE 1

Comparative LR6 (cylindrical alkaline Zn/MnO$_2$) cells, having a conventional design similar to that shown in FIG. 1, were made as described below. Quantities and dimensions disclosed are nominal values.

A cathode mixture was made by blending together EMD and expanded natural graphite, in a ratio of 25:1 by weight, 4.45 weight percent (based on the total cathode mixture) of 45 weight percent aqueous KOH solution, and 0.65 weight percent (based on the total cathode mixture) of polyethylene binder.

Steel cans, plated on the outside surface with nickel and on the inside surface with nickel and cobalt, were coated with a graphite coating on that portion of the inside surface intended to make contact with the cathode. The cans had side walls 0.010 inch (0.25 mm) thick, with an inside diameter of 0.526 inch (13.36 mm).

Cathode mixture was molded into rings, each 0.421 inch (10.69 mm) high and having an outside diameter of 0.522 inch (13.26 mm) and an inside diameter of 0.343 inch (8.71 mm), using a commercial tablet press. The average weight and density of the rings were 2.71 grams and 3.23 grams/cm$^3$, respectively. Four cathode rings were inserted into each can and formed into a cathode 1.667 inch (42.34 mm) high, with an inside diameter of 0.350 inch (8.89 mm). The formed cathodes had an average density of 3.26 grams/cm$^3$, resulting in 74.1 percent solids packing (volume percent solid materials).

A piece of separator paper 2.244 inches (57.00 mm) long by 2.087 inches (53.00 mm) wide was scrolled around a 0.320 inch (8.13 mm) diameter mandrel to form a convolute tube 1.772 inches (45.01 mm) high. The paper at the bottom of the tube was folded inward to form a basket shape to cover and conform to the inside surfaces of the cathode and the can bottom. The separator paper was pressed and heated to seal the separator layers and maintain the basket shape. The formed separator basket was inserted into the cavity within the cathode, and 1.3 g of 37 weight percent KOH in deionized water was added to soak the separator.

Anode gel mixture was made by blending together the following (all percentages based on weight): 70.00 percent zinc alloy powder, 0.42 percent gelling agent, 28.39 percent electrolyte solution, 0.02 weight percent In(OH)$_3$, and 1.17 percent 0.1 N KOH. The electrolyte solution contained KOH (38.7 percent), ZnO (3.0 percent), sodium silicate (0.11 percent), and deionized water (58.19 percent).

Anode mixture (6.42 grams) was dispensed into the cavity within the separator of each cell. The anode:cathode theoretical capacity ratio of the cell was 0.989:1, based on a 1.33 electron discharge of the EMD.

Each cell was closed by placing an anode collector assembly into the open end of the can, followed by a negative terminal cover. Each cell was sealed by crimping the top edge of the can inward and over the top of the seal and terminal cover.

Each cell was completed by welding a positive terminal cover to the bottom of the can and placing a label over the outside of the can, extending over the ends of the cell.

EXAMPLE 2

Comparative LR6 cells, similar to the cells in Example 1, were made. The seal assembly design was one requiring less volume, so that the anode and cathode heights could be increased, and thinner cans were used.

A cathode mixture was made by blending together 93.48 weight percent EMD, 4.17 weight percent expanded natural graphite (a ratio of 22:1), 41.5 weight percent of 40 weight percent aqueous KOH solution, and 0.65 weight percent of polyethylene binder (based on the total cathode mixture).

Steel cans, plated on the outside surface with nickel and on the inside surface with nickel and cobalt, were coated with a graphite coating on that portion of the inside surface intended to make contact with the cathode. The cans had side walls 0.008 inch (0.20 mm) thick, with an inside diameter of 0.530 inch (13.46 mm).

Cathode mixture was molded into rings, each 0.435 inch (11.05 mm) high and having an outside diameter of 0.526 inch (13.36 mm) and an inside diameter of 0.345 inch (8.76 mm), using a commercial tablet press. The rings had an average weight and average density of 2.78 grams and 3.18 grams/cm$^3$, respectively.

Four cathode rings were inserted into each can and formed into a cathode. The formed cathode was 1.700 inch (43.18 mm) high, had an inside diameter of 0.350 inch (8.89 mm) and had a cathode density of 3.19 g/cm$^3$, resulting in 74.6 percent solids packing (volume percent solid materials).

A separator basket was formed, inserted and soaked with KOH solution as described in Example 1.

Anode gel mixture was made by blending together the following (all percentages based on weight): 70 percent zinc alloy powder, 0.42 percent gelling agent, 28.39 percent electrolyte solution, 0.02 weight percent In(OH)$_3$, and 1.17 percent 0.1 N KOH. The electrolyte solution contained KOH (35.8 percent), ZnO (3.0 percent), and sodium silicate (0.11 percent).

Anode mixture (6.62 grams) was dispensed into the cavity within the separator of each cell. The anode:cathode theoretical capacity ratio of the cell was 0.966:1, based on a 1.33 electron discharge of the EMD.

Each cell was closed by placing an anode collector assembly, including a plastic seal, a metal inner cover and an anode current collector into the open end of the can. The anode current collector, disposed in a central hole in the seal, extended into the anode mixture in the cell. A negative terminal cover was placed on top of the anode collector assembly, so the top end of the anode current collector was in firm contact with the terminal cover, and the cell was sealed by crimping the top edge of the can inward and over the top of the seal and terminal cover.

Each cell was completed by welding a positive terminal cover to the bottom of the can and placing a label over the outside of the can, extending over the ends of the cell.

EXAMPLE 3

Figure 5:
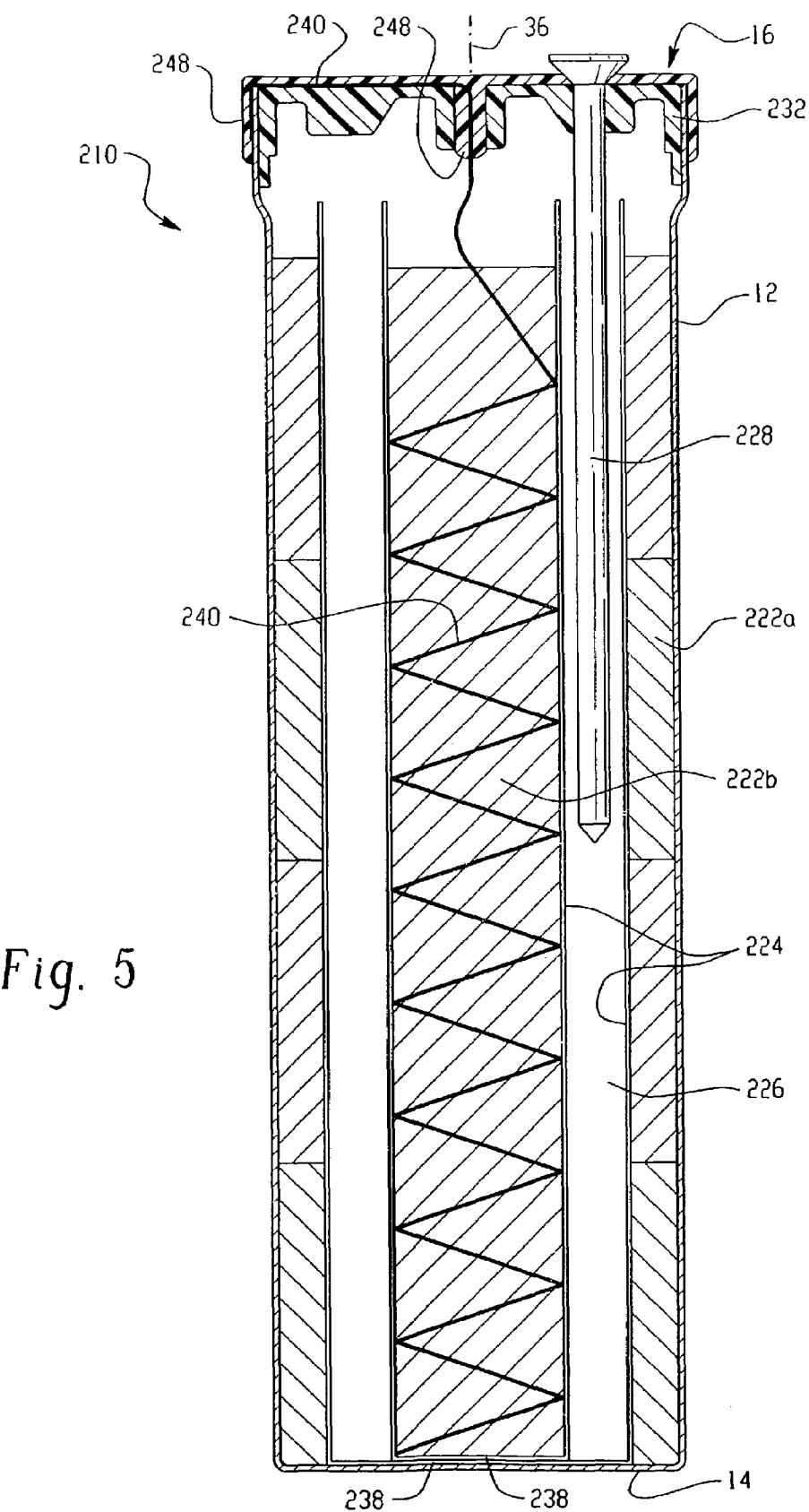
FIG. 5 is a cross-sectional view of a second embodiment of the battery cell of the invention, taken along the longitudinal axis of the cell.

Cells according to one embodiment of the invention, as illustrated in FIG. 5, were made in a manner similar to those in Example 1, except for the following.

The cans had side walls 12 0.008 inch (0.20 mm) thick, with an inside diameter of 0.530 inch (13.46 mm). Each cell 210 had two cathodes, an outer cathode 222a and a central cathode 222b. For the outer cathode 222a, the cathode rings were each 0.426 inch (10.82 mm) high and had an outside diameter of 0.525 inch (13.34 mm), an inside diameter of 0.402 inch (10.21 mm), an average weight of 2.10 grams, and a density of 3.33 grams/cm$^3$. The formed outer cathode 222a was 1.675 inch (43.55 mm) high and had an inside diameter of 0.407 inch (10.34 mm), a density of 3.35 grams/cm$^3$ and 76.3 solids packing. The central cathode 222b was formed by molding 3.253 grams of the same cathode mixture as used for the outer cathode 222a in a die set. A current collector 240 made of nickel mesh (grade 3Ni 5-077 from Delker Corporation, Branford, Conn. USA), was disposed within and extended above the cathode 222b, as shown in FIG. 5. The formed central cathode 222b contained 3.253 grams of cathode mix, was 1.626 inches (41.30 mm) high and a 0.218 inch (5.54 mm) diameter, and was packed to 75.2 percent solids.

The portion of the current collector 240 extending above the cathode was inserted through a central hole in and extending above a plastic seal 232. The hole was sealed with epoxy 248.

Two separators 224 were formed for each cell 210—one for insertion against the inner surface of the outer cathode 222a and one for around the outer surface of the central cathode 222b. The outer separator 224 was formed by scrolling a piece of separator paper 2.638 inches (67.01 mm) by 2.087 inch (53.01 mm) around a 0.398 inch (10.11 mm) diameter mandrel to form a convolute separator tube 1.800 inch (45.72 mm) high. The scrolled outer separator was folded inward at the bottom 238 and heat sealed to form a basket, similar to the formed separator 24 in Example 1. The second separator 224 was cut to 1.590 inch (40.39 mm) by 1.900 inch (48.26 mm) and scrolled around a 0.224 inch (5.69 mm) diameter mandrel to form a 1.900 inch (48.26 mm) long convolute separator tube, which was folded and heated to form a basket.

The outer separator basket was inserted into the cavity formed by the outer cathode 222a, and 1.2 grams of 37 weight percent KOH solution was added to the cell to soak the separator 224. The central cathode 222b was inserted into its separator basket.

Anode gel mixture 226 (6.6 grams) was dispensed into the cavity within the outer cathode separator basket.

The central cathode 222b, with its separator 224 in place around it, was inserted into the anode mixture 226. The seal 232, affixed to the current collector 240 extending above the top of the central cathode 222b, was positioned in the top of the cell 210. The portion of the central cathode current collector 240 extending above the seal 232 was folded over the top of the seal 232 and welded to the outside top portion of the can sidewall 12. An anode nail current collector 228 was inserted through a hole in the seal 232 into the cell 210, extending into the anode mixture 226. The cell 210 was sealed by covering the top portion of the cell with epoxy 248, leaving the top anode current collector 228 exposed.

Because the cells in Example 3 were used only for discharge testing, they were not finished in the conventional manner for LR6 cells, with terminal covers and a jacket.

EXAMPLE 4

Cells from Examples 1, 2 and 3 were discharged on five groups of tests, and the results are summarized in Table 1. Table 1 shows the discharge duration for Example 2 and Example 3 cells as a percentage of the discharge duration for Example 1 cells on the same tests. The percentages shown for each group of tests are the averages of the normalized results on each test in the group. On each test the average discharge duration of the cells from Example 1 was considered 100, and the corresponding discharge duration of the cells from each of Examples 2 and 3 was expressed proportionally. The normalized average discharge duration for cells from each of Examples 2 and 3 was therefore equal to a percentage of the average for the Example 1 cells. The tests included in each group were:

(1) High power:
  1000 mW continuous discharge to 1.0 volt;
  1000 mW intermittent discharge (3 seconds on, 7 seconds off, 1 hour per day) to 1.0 volt; and
  1000 mW intermittent discharge (30 minutes continuous per day) to 1.0 volt.
(2) Medium power:
  250 mW intermittent discharge (1 hour per day) to 0.9 volt; and
  500 mW intermittent discharge (1 hour per day) to 0.9 volt.
(3) High rate: 1000 mA continuous to 1.0 volt.
(4) High tech:
  1000 mA continuous discharge to 1.0 volt;
  1000 mA intermittent discharge (10 seconds on, 50 seconds off, 1 hour per day) to 0.9 volt; and
  250 mA intermittent discharge (1 hour per day) to 0.9 volt.
(5) ANSI (American National Standard for Dry Cells and Batteries—Specifications, ANSI C18.1):
  43 ohm intermittent discharge (4 hours per day) to 0.9V;
  24 Ohm intermittent discharge (15 seconds on, 45 seconds off, 8 hours per day) to 1.0 volt;
  10 ohm intermittent discharge (1 hour per day) to 0.9 volt;
  3.9 ohm intermittent discharge (1 hour per day) to 0.8 volt;
  1000 mA continuous discharge to 1.0 volt;
  1000 mA intermittent discharge (10 seconds on, 50 seconds off, 1 hour per day) to 0.9 volt; and
  250 mA intermittent discharge (1 hour per day) to 0.9 volt.

TABLE 1

| | Average Discharge Duration Compared to Example 1 | |
| --- | --- | --- |
| Test Group | Example 2 | Example 3 |
| High Power | 112% | 212% |
| Medium Power | 106% | 130% |
| High Rate | 108% | 198% |
| High Tech | 111% | 146% |
| ANSI | 109% | 122% |

The cells from Example 2 performed better than those from Example 1, partly because of an increase in the theoretical capacity of the cell (equal to the theoretical capacity of the anode, since the anode had a lower theoretical capacity than the cathode), and partly because of an increase in the cathode volume and electrode interfacial surface area. The high power and high rate test groups are the groups in which the current density at the electrode interfaces is highest during discharge, so improvements in cell discharge efficiency would be expected to have the greatest effects on these tests. Example 3 cells have an increased electrode interfacial surface area, which is known to reduce current density and improve discharge efficiency, and they performed much better than the cells from Example 1 on the High Power and High Rate tests (212% and 198%, respectively). However, the amount of improvement is substantially greater than would have been expected based on the increase in electrode interfacial surface area. The interfacial surface area of the cells in Example 3 was about 178 percent of that of the cells in Example. Based on an expected increase in discharge duration equal to about 1+log (interfacial surface area increase over Example 1, cells from Example 3 would be expected to have discharge durations about 125 percent times the discharge durations of cells from Example 1 on the High Rate and High Power tests.

Figure 6:
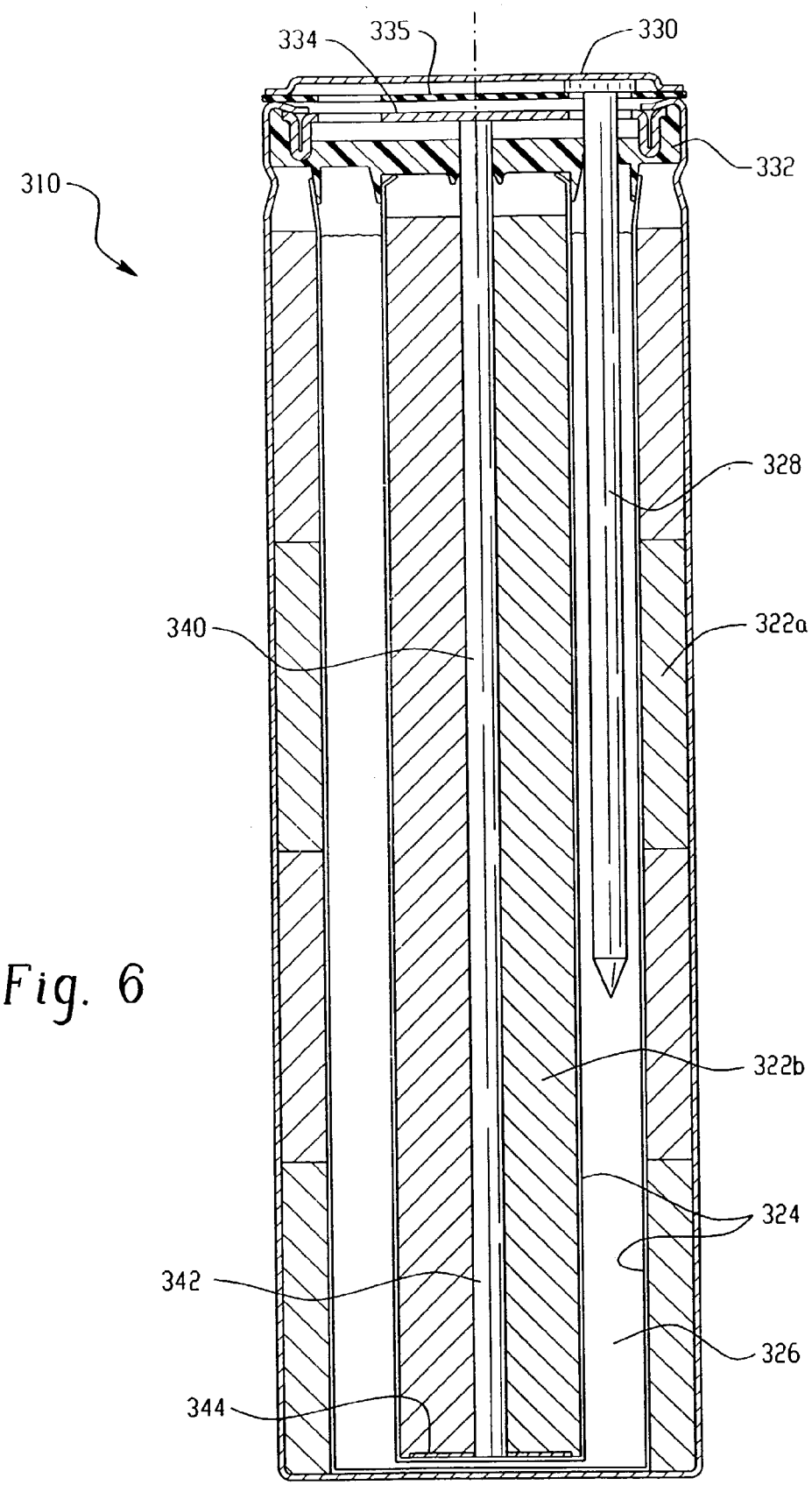
FIG. 6 is a cross-sectional view of a third embodiment of the battery cell of the invention, taken along the longitudinal axis of the cell.

Other cell designs have also been developed. In one embodiment, shown in FIG. 6, cell 310 has an outer cathode 322a, a central cathode 322b and a single anode 326, disposed between the cathodes 322a and 322b. The central cathode 322b is shown as a single molded body, though it could be made from a stack of molded rings. The central cathode current collector 340 includes a pin or rod 342, located at the longitudinal axis of the central cathode 322b. This pin 342 extends above the central cathode 322b and through a hole in a seal 332 to a metal cell cover 334. The top edge of the can is folded inward to make contact with the cell cover 334 so that the can is in electrical contact with the central cathode current collector 340. At the end of the pin 340, disposed within the cathode 322b, a horizontal metal disc 344 is welded. This disc 344 increases the contact surface area with the cathode 322b and maintains good contact with the cathode 322b during discharge. The pin 342 may have a smooth cylindrical shape as shown in FIG. 6, or the shape may be modified to increase the surface area and/or improve contact with the cathode 322b. For example, the pin 342 may be grooved, vertically, horizontally, or helically, or it may be coiled, as in a spring. The pin 342 may extend substantially through the cathode 322b, as shown in FIG. 6, or it may extend only partially into the cathode 322b. The disc 344 may be a thin solid or perforated metal sheet or a metal screen. Additional discs 344 may be attached to the pin 342. A disc 344 may be placed at one or both of the top and bottom surfaces of the cathode 322b. All or part of the current collector 340 can be coated with a graphite coating, similar to that applied to the inside surface of the can.

The anode current collector 328 extends above the anode mixture 326 and through matching holes in the seal 332 and the cell cover 334. A negative terminal cover 330 is welded to the top of the anode current collector 328. An electrically nonconductive washer 335 is placed over the top of the cell 310 to insulate the negative terminal cover 330 from the folded over edge of the can.

A two-piece separator 324 is disposed in the cell in a manner similar to that described in Example 3 and illustrated in FIG. 5.

Although not shown, the cell 310 in FIG. 6 may also have a positive terminal cover and a jacket, similar to that shown in FIG. 1.

Cell 410 (FIG. 7) is another embodiment, similar to cell 310. However, in cell 410 the central cathode 422b is shown as a stack of six molded cathode rings, each having a height of 0.270 inch (6.86 mm), an outside diameter of 0.215 inch (5.46 mm), and an inside diameter of 0.046 inch (1.17 mm). The central cathode current collector 440 includes a central pin 442 and seven thin (e.g., 0.004-0.006 inch (0.10-0.15 mm)) solid horizontal discs 444. The flat surfaces of the discs 444 can be coated with graphite. The central cathode 422b is assembled by alternately placing the central cathode 422b rings and current collector discs 444 on the pin 442, with one disc 444 at each of the bottom and the top of the stack, and compressing the stack slightly. The discs 444 are electrically connected to the pin 442, e.g., by interference fit or welding. The pin 442 may be slightly smaller than the inside diameter of the rings for ease of assembly, or there may be a slight interference fit for improved electrical contact.

Each of the embodiments described above and shown in FIGS. 3, 5, 6, and 7 has certain advantages. Table 2 shows exemplary characteristics of these embodiments compared to comparative Example 1.

TABLE 2

Figure 7:
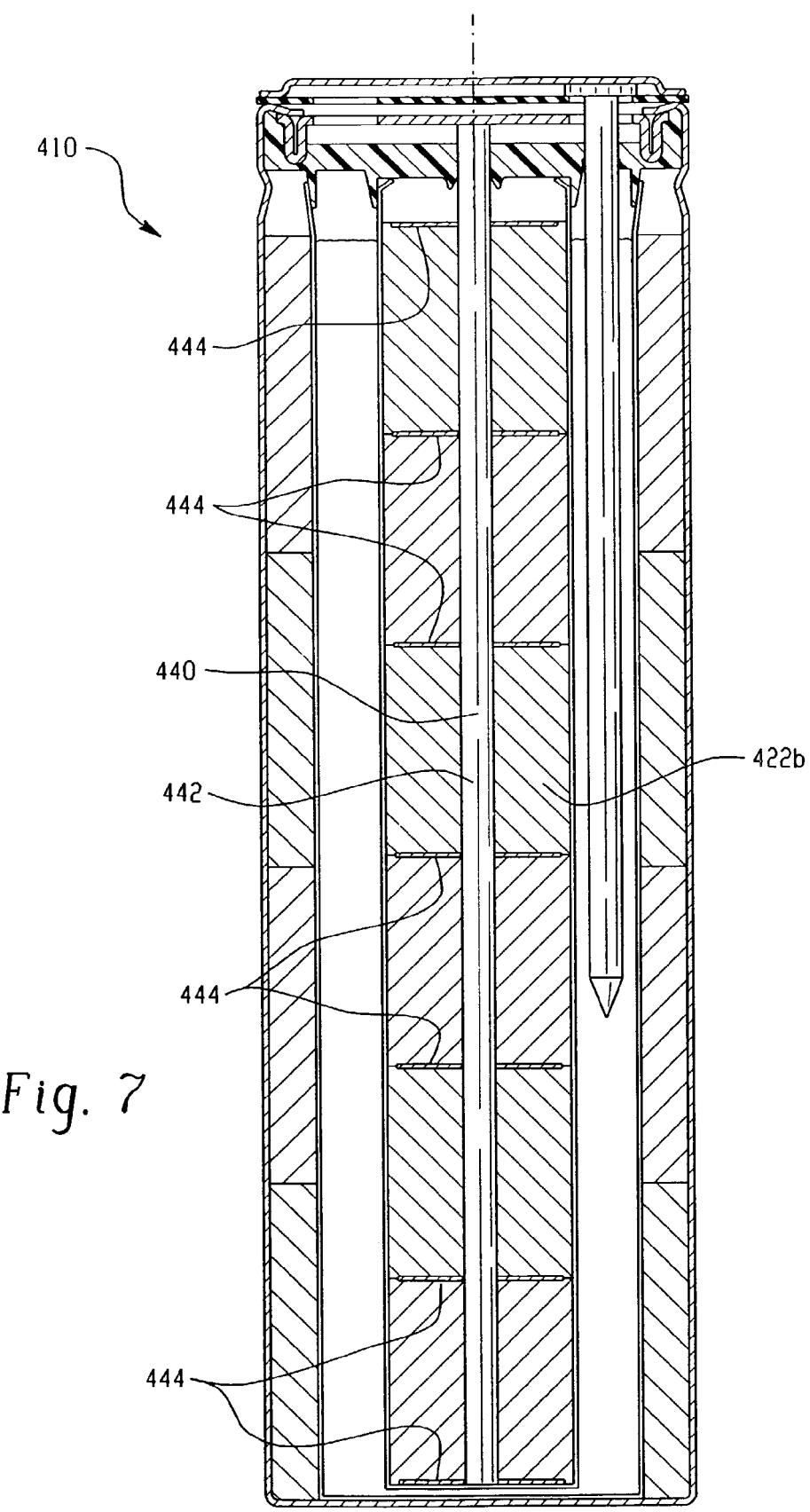
FIG. 7 is a cross-sectional view of a fourth embodiment of the battery cell of the invention, taken along the longitudinal axis of the cell.

| Ref. | Characteristic | Cell 10 FIG. 1 Ex. 1 | Cell 10 FIG. 1 Ex. 2 | Cell 110 FIG. 3 | Cell 210 FIG. 5 Ex. 3 | Cell 310 FIG. 6 | Cell 410 FIG. 7 |
|---|---|---|---|---|---|---|---|
| A | Outer cathode interfacial surface area (cm$^2$) | 11.83 | 12.06 | 13.82 | 13.82 | 13.82 | 13.82 |
| B | Central cathode interfacial surface area (cm$^2$) | — | — | 7.14 | 7.14 | 7.14 | 7.14 |
| C | Total cathode interfacial surface area (cm$^2$) | 11.83 | 12.06 | 21.0 | 21.0 | 21.0 | 21.0 |
| D | Outer cathode volume (cm$^3$) | 3.31 | 3.47 | 2.48 | 2.48 | 2.48 | 2.48 |
| E | Central cathode volume (cm$^3$) | — | — | 0.92 | 0.98 | 0.94 | 0.92 |
| F | Total cathode volume (cm$^3$) | 3.31 | 3.47 | 3.4 | 3.46 | 3.42 | 3.4 |
| G | Out. cath. current collector contact surface area (cm$^2$) | 17.77 | 18.26 | 17.99 | 17.99 | 17.99 | 17.99 |
| H | Cent. cath. current collect. contact surface area (cm$^2$) | — | — | 3.94 | 4.4 | 1.54 | 3.94 |
| I | Outer cathode effective radial thickness (mm) | 2.29 | 2.29 | 1.56 | 1.56 | 1.56 | 1.56 |
| J | Central cathode effective radial thickness (mm) | — | — | 2.17 | 2.77 | 2.17 | 2.17 |
| K | Outer cathode theoretical capacity (mAh) | 3730 | 3937 | 2901 | 2901 | 2901 | 2901 |
| L | Central cathode theoretical capacity (mAh) | — | — | 1002 | 1065 | 1024 | 1002 |
| M | Total cathode theoretical capacity (mAh) | 3730 | 3937 | 3903 | 3966 | 3925 | 3903 |
| N | Anode effective radial thickness (mm) | 3.7 | 3.7 | 2.2 | 2.2 | 2.2 | 2.2 |
| O | Anode theoretical capacity (mAh) | 3685 | 3800 | | 3788 | | |

TABLE 2-continued

| Ref. | Characteristic | Cell 10 FIG. 1 Ex. 1 | Cell 10 FIG. 1 Ex. 2 | Cell 110 FIG. 3 | Cell 210 FIG. 5 Ex. 3 | Cell 310 FIG. 6 | Cell 410 FIG. 7 |
|---|---|---|---|---|---|---|---|
| P | Outside diameter of coaxial electrodes (mm) | 13.36 | 13.46 | — | 13.46 | — | — |
| | Ratio A:D ($cm^2/cm^3$) | 3.57 | 3.48 | 5.57 | 5.57 | 5.57 | 5.57 |
| | Ratio B:E ($cm^2/cm^3$) | — | — | 8.04 | 7.55 | 7.87 | 8.04 |
| | Ratio C:F ($cm^2/cm^3$) | 3.57 | 3.48 | 6.16 | 6.06 | 6.13 | 6.16 |
| | Ratio G:D ($cm^2/cm^3$) | 5.37 | 5.26 | 7.25 | 7.25 | 7.25 | 7.25 |
| | Ratio H:E ($cm^2/cm^3$) | — | — | 4.28 | 4.49 | 1.64 | 4.28 |
| | Ratio I:J | — | — | 0.72 | 0.56 | 0.72 | 0.72 |
| | Ratio K:L | — | — | 2.90 | 2.72 | 2.83 | 2.90 |
| | Ratio K:A ($mAh/cm^2$) | 315 | 326 | 210 | 210 | 210 | 210 |
| | Ratio L:B ($mAh/cm^2$) | — | — | 140 | 149 | 143 | 140 |
| | Ratio M:C ($mAh/cm^2$) | 315 | 326 | 186 | 189 | 187 | 186 |

Table 2 shows that Cells 110, 210, 310 and 410 all have significant increases in electrode interfacial surface area and decreases in electrode thicknesses over Cell 10, while still maintaining comparable or slightly higher theoretical capacities. While there are differences among Cells 110, 210, 310 and 410, these cells are similar in electrode interfacial surface area and electrode thicknesses.

The embodiments of the invention shown in FIGS. 3, 5, 6 and 7 are cylindrical cells, and they are often used in single cell batteries. However, embodiments with cells having other shapes (e.g., prismatic cells) are also anticipated, as are batteries comprising more than one cell.

Other embodiments of the invention can be cells having one or more additional electrodes not disposed coaxially with the coaxially disposed electrodes.

The invention may also be adapted to other types of cells, both primary and rechargeable, including cells having other electrochemical systems, such as rechargeable nickel-cadmium and nickel-metal hydride cells and both primary and rechargeable lithium-manganese dioxide and lithium-iron disulfide cells.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A primary electrochemical battery cell comprising a container, a first positive electrode comprising a manganese oxide and a carbon, a first negative electrode comprising zinc, a separator disposed between adjacent positive and negative electrodes, and an electrolyte comprising an aqueous alkaline solution; wherein:
the cell comprises a second of at least one of the positive and negative electrodes;
all first and second electrodes are disposed coaxially with respect to each other, with alternating polarities, such that each of the first and second electrodes has at least one surface that interfaces with another of the coaxial electrodes through the separator; and
at least the first positive electrode contains greater than 60 percent but not greater than 80 percent solid materials by volume.

2. The battery cell as defined in claim 1, wherein the solid materials content in at least the first positive electrode is greater than 70 percent by volume.

3. The battery cell as defined in claim 2, wherein the solid materials content in at least the first positive electrode is at least 75 percent by volume.

4. The battery cell as defined in claim 3, wherein the solid materials content in each coaxial positive electrode is at least 75 percent by volume.

5. The battery cell as defined in claim 1, wherein the cell comprises first and second positive electrodes, the first positive electrode is disposed radially outward from the second positive electrode, and the second positive electrode is a central coaxial electrode.

6. The battery cell as defined in claim 5, wherein each coaxial electrode has a circular cylindrical interfacial surface shape and a radial thickness, and a ratio of the first positive electrode radial thickness to the second positive electrode radial thickness is from 0.5:1 to 1.3:1.

7. The battery cell as defined in claim 6, wherein the ratio of the first positive electrode radial thickness to the second positive electrode radial thickness is from 0.6:1 to 1.0:1.

8. The battery cell as defined in claim 7, wherein the ratio of the first positive electrode radial thickness to the second positive electrode radial thickness is from 0.7:1 to 0.8:1.

9. The battery cell as defined in claim 5, wherein each of the first and second positive electrodes has a theoretical capacity, and the ratio of the first positive electrode theoretical capacity to the second positive electrode theoretical capacity is from 1.5:1 to 4.0:1.

10. The battery cell as defined in claim 1, wherein the first positive electrode is the outermost coaxial electrode.

11. The battery cell as defined in claim 10, wherein the second positive electrode comprises a manganese oxide and has a current collector comprising at least one first conductive component having a form selected from the group consisting of a grid, a mesh, a perforated sheet, and an expanded metal.

12. The battery cell as defined in claim 11, wherein the at least one first conductive component of the second positive electrode current collector is disposed within a radially outer portion of the second positive electrode.

13. The battery cell as defined in claim 11, wherein the at least one first conductive component of the second positive electrode current collector extends radially outward from a centrally disposed second conductive component, the second conductive component having a form selected from the group consisting of a wire, a pin, a nail, and a rod.

14. The battery cell as defined in claim 1, wherein the first negative electrode has a current collector comprising a single conductive member having a form selected from the group consisting of a wire, a pin, a nail, and a rod.

15. The battery cell as defined in claim 1, wherein the cell comprises at least two coaxial positive electrodes, each coaxial positive electrode has a volume, the cell has a total coaxial positive electrode volume and a total coaxial positive electrode interfacial surface area, and a ratio of the total coaxial positive electrode interfacial surface area to the total coaxial positive electrode volume is at least $5.0 \text{ cm}^2:1 \text{ cm}^3$.

16. The battery cell as defined in claim 15, wherein the ratio of the total coaxial positive electrode interfacial surface area to the total coaxial positive electrode volume is less than $25 \text{ cm}^2:1 \text{ cm}^3$.

17. The battery cell as defined in claim 16, wherein the ratio of the interfacial surface area to the volume of the outermost of the coaxial positive electrodes is not more than $8.0 \text{ cm}^2:1 \text{ cm}^3$.

18. The battery cell as defined in claim 17, wherein the ratio of the total coaxial positive electrode interfacial surface area to the total coaxial positive electrode volume is from $5.6:1 \text{ cm}^3$ to $6.9 \text{ cm}^2:1 \text{ cm}^3$.

19. The battery cell as defined in claim 5, wherein the first positive electrode has a minimum radial thickness of at least 0.060 inch.

20. The battery cell as defined in claim 1, wherein each coaxial positive electrode has a surface in contact with a current collector and a current collector contact surface area, each coaxial positive electrode comprises electrolytic manganese dioxide, and the current collector contact surface area is at least $1.8 \text{ cm}^2$ per gram of electrolytic manganese dioxide for each coaxial positive electrode.

21. The battery cell as defined in claim 1, wherein each coaxial positive electrode has a surface in contact with a current collector and a current collector contact surface area, and each coaxial positive electrode has an electrode-current collector contact resistance of less than 2 milliohms per $\text{cm}^2$ of contact surface area when measured at 21° C.

22. The battery cell as defined in claim 1, wherein:
the second of at least one of the positive and negative electrodes is at least a positive electrode;
each of the first and second positive electrodes has a resistivity of no more than 0.5 ohm-cm when measured at 21° C.;
each of the first and second positive electrodes has a volume;
each of the first and second positive electrodes has a surface in contact with a current collector and a current collector contact surface area; and
the current collector contact surface area of each of the first and second positive electrodes is at least $5.0 \text{ cm}^2$ per $\text{cm}^3$ of volume of that electrode.

23. The battery cell as defined in claim 1, wherein the second of at least one of the positive and negative electrodes is at least a positive electrode, each of the first and second positive electrodes comprises a manganese oxide and a carbon, the first positive electrode is disposed adjacent to a side wall of the container and has a weight ratio of manganese oxide:carbon of 15:1 to 30:1.

24. The battery cell as defined in claim 23, wherein the weight ratio of manganese oxide:carbon in first positive electrode is 18:1 to 25:1.

25. The battery cell as defined in claim 23, wherein the weight ratio of manganese oxide:carbon in the second positive electrode is 14:1 to 16:1.

26. The battery cell as defined in claim 1, wherein the first positive electrode is not the outermost of the coaxial electrodes and is in contact with a current collector that comprises radially extending components disposed within the first positive electrode.

27. The battery cell as defined in claim 1, wherein the first positive electrode is not the outermost of the coaxial electrodes and is in contact with a current collector that comprises a member disposed at a radially outer surface of the first positive electrode.

28. The battery cell as defined in claim 1, wherein at least one coaxial electrode interfacial surface has a shape other than a circular cylinder.

29. The battery cell as defined in claim 28, wherein the other than circular cylindrical shape comprises radially extending lobes, each lobe comprising convex and concave surfaces.

30. The battery cell as defined in claim 29, wherein all convex and concave surfaces have radii of no less than 0.030 inch.

31. The battery cell as defined in claim 30, wherein all convex and concave surfaces have radii of no less than 0.060 inch.

32. The battery cell as defined in claim 29, wherein each lobe has a width, perpendicular to a radial centerline of the lobe, that does not decrease as a radial distance from a longitudinal axis of the cell increases.

33. The battery cell as defined in claim 32, wherein the width of each lobe increases as the radial distance from the longitudinal axis of the cell increases.

34. The battery cell as defined in claim 1, wherein the cell further comprises at least one electrode that is not coaxially disposed with the first positive and negative electrodes.

35. A primary electrochemical battery cell comprising a container, a first positive electrode comprising a manganese oxide and a carbon, a first negative electrode comprising zinc, a separator disposed between adjacent positive and negative electrodes, and an electrolyte comprising an aqueous alkaline solution; wherein:
the cell comprises a second of at least one of the positive and negative electrodes;
the electrodes are disposed coaxially with respect to each other, with alternating positive and negative electrodes, such that each of the first and second electrodes has at least one surface that interfaces with another of the coaxial electrodes through the separator;
at least the first positive electrode contains greater than 60 percent but not greater than 80 percent solid materials by volume;
each coaxial positive electrode has a theoretical capacity and an interfacial surface area; and
a ratio of the total theoretical capacity to the total interfacial surface area of the combined coaxial positive electrodes is $180 \text{ mAh}:1 \text{ cm}^2$ to $220 \text{ mAh}:1 \text{ cm}^2$.

36. The battery cell as defined in claim 35, wherein the solids materials content in at least the first positive electrode is greater than 70 percent by volume.

37. The battery cell as defined in claim 36, wherein the solids materials content in at least the first positive electrode is at least 75 percent by volume.

38. The battery cell as defined in claim 37, wherein the solids materials content in each coaxial positive electrode is at least 75 percent by volume.

39. The battery cell as defined in claim 38, wherein the zinc concentration in at least the first negative electrode is 70 to 76 percent by weight.

40. The battery cell as defined in claim 35, wherein each coaxial electrode has an interfacial surface with a circular cylindrical shape.

41. The battery cell as defined in claim 35, wherein each coaxial positive electrode has a resistivity no greater than 0.5 ohm-cm, a volume, a total interfacial surface area, and a ratio of total interfacial surface area:volume of no less than 5.0 cm$^2$:1 cm$^3$.

42. The battery cell as defined in claim 41, wherein the ratio of total interfacial surface area:volume is at least 6.0 cm$^2$:1 cm$^3$.

43. The battery cell as defined in claim 35, wherein the second electrode is a positive electrode, and the first and second positive electrodes differ in composition.

44. The battery cell as defined in claim 35, wherein the second electrode is a negative electrode, and the first and second negative electrodes differ in composition.

45. The battery cell as defined in claim 35, wherein the battery cell is an LR6 cell.

46. A primary electrochemical battery cell comprising a container, a first positive electrode comprising a manganese oxide and a carbon, a first negative electrode comprising zinc, a separator disposed between adjacent positive and negative electrodes, and an electrolyte comprising an aqueous alkaline solution; wherein:

the cell comprises a second of at least one of the positive and negative electrodes;

the electrodes are disposed coaxially with respect to each other, with alternating positive and negative electrodes, such that each of the first and second electrodes has at least one surface that interfaces with another of the coaxial electrodes through the separator;

at least the first positive electrode contains greater than 60 percent but not greater than 80 percent solid materials by volume;

each coaxial positive electrode has a volume and an interfacial surface area; and a ratio of the total interfacial surface area to the total volume of the coaxial positive electrodes is 5.6 cm$^2$:1 cm$^3$ to 6.9 cm$^2$:1 cm$^3$.

47. The battery cell as defined in claim 46, wherein the battery cell is an LR6 cell.

* * * * *